(12) United States Patent
Narváez Mastache et al.

(10) Patent No.: US 11,040,919 B2
(45) Date of Patent: Jun. 22, 2021

(54) FERTILIZING COMPOSITION BASED ON SOY HYDROLYSATES

(71) Applicant: AZUL NATURAL S.A. DE C.V., Durango (MX)

(72) Inventors: José Manuel Narváez Mastache, Durango (MX); Rosa Laura Andrade Melchor, Corregidora (MX)

(73) Assignee: AZUL NATURAL S.A. DE C.V.

( * ) Notice: Subject to any disclaimer, the term of this patent is extended or adjusted under 35 U.S.C. 154(b) by 279 days.

(21) Appl. No.: 16/313,027

(22) PCT Filed: Jun. 23, 2016

(86) PCT No.: PCT/MX2016/050007
§ 371 (c)(1),
(2) Date: Dec. 22, 2018

(87) PCT Pub. No.: WO2017/222360
PCT Pub. Date: Dec. 28, 2017

(65) Prior Publication Data
US 2019/0248713 A1    Aug. 15, 2019

(51) Int. Cl.
*C05F 11/10*    (2006.01)
*C05C 11/00*    (2006.01)

(52) U.S. Cl.
CPC .............. *C05F 11/10* (2013.01); *C05C 11/00* (2013.01)

(58) Field of Classification Search
CPC .................................. C05F 11/10; C05C 11/00
See application file for complete search history.

(56) References Cited

U.S. PATENT DOCUMENTS

| 2002/0011086 | A1  | 1/2002  | Gunner et al. |
| 2006/0168881 | A1* | 8/2006  | Straumietis ............ A01G 31/00 47/62 R |
| 2007/0131010 | A1* | 6/2007  | Binder ...................... C05C 3/00 71/23 |
| 2008/0302151 | A1* | 12/2008 | Stemwedel ............. C05F 11/00 71/23 |
| 2015/0000356 | A1* | 1/2015  | Foody ...................... C05D 9/00 71/8 |
| 2016/0050915 | A1* | 2/2016  | Demares ................ A01N 25/32 424/93.1 |
| 2016/0236996 | A1* | 8/2016  | Chaudhry ............... C05F 17/20 |

FOREIGN PATENT DOCUMENTS

| CN | 102199059 | 9/2011 |
| ES | 2499891   | 9/2014 |

OTHER PUBLICATIONS

International Search Report for corresponding PCT App. No. PCT/MX2016/050007 dated Dec. 22, 2016.

* cited by examiner

*Primary Examiner* — Jennifer A Smith
*Assistant Examiner* — Amanda Garley
(74) *Attorney, Agent, or Firm* — Emerson, Thomson & Bennett, LLC; Roger D. Emerson; Peter R. Detorre

(57) ABSTRACT

A foliar fertilizer composition rich in oligosaccharides and phytohormones obtained from the sequential hydrolysis of a soybean paste, with a proteolytic enzyme with cysteine active site and a cellulase isolated from *Trichoderma harzianum*.

15 Claims, No Drawings

FERTILIZING COMPOSITION BASED ON SOY HYDROLYSATES

FIELD OF THE INVENTION

The present invention generally relates to a fertilizer made based on soybean hydrolysates, more particularly to a novel foliar fertilizer composition rich in oligosaccharides, carboxylic acids and phytohormones obtained by sequential two-step hydrolysis of soybean paste.

BACKGROUND OF THE INVENTION

Over the past few years, the use of chemical fertilizers has caused a number of drawbacks that have in many cases caused residual environmental pollution and changes in the growth pattern of endemic species. Also, the massive use of these products has not been exempt of problems, since the agrochemicals used many times get to have a certain degree of toxicity on the crops, which in case of an overexposure to the product, they come to present unwanted alterations which reduce crop quality.

In this sense, studies have been carried out to try to find substitutes from natural origin for this type of products. One of the alternatives that has presented a greater development is the use of hydrolysates from organic materials, which have the advantage of being, in the majority, of very low phytotoxicity, in addition to being highly biocompatible with most of the cultures. However, most of these products are not as potent as those containing agrochemicals and their use requires additional supplementation with other commercial products. To avoid this, a series of formulations have been proposed which contain, in addition to the hydrolyzate, other trace elements that supplement the nutritional deficiencies of the same. Examples of such type of fertilizers are described in U.S. Pat. No. 4,491,464 A, which protects a fertilizer composition comprising a mixture of potassium and ammonium polyphosphates, which also contains an effective amount of a protein hydrolysate. However, this composition has only been shown to increase the phosphorus and potassium content in plant tissues and has only 0.5% to 3.0% the protein hydrolysate, which does not guarantee an adequate contribution of the other macro and micro-elements required by Cultures with specific nutritional requirements. On the other hand, the used hydrolyzed protein only provides simple chemical elements and there is no indication that the used hydrolysate also provides oligosaccharides or essential amino acids.

U.S. Pat. No. 6,406,511 B2 discloses a sprayable organic fertilizer for application to soil or directly to the plant, including denatured soybean particles having a total protein content of at least 50% to 90% by weight, wherein the denatured soybean particles have a particle size of not more than 250 microns and wherein said particles are dispersed in an appropriate amount of a liquid carrier so that the particles can be evenly sprayed. In such a proposal, the denatured soybean particles can be mixed with a yeast extract which stimulates microbial growth of the soil. However, the described fertilizer does not provide free amino acids or complex oligosaccharides, since the denaturing process eliminates a large portion of such compounds.

U.S. patent application 2008/0302151 A1 discloses a liquid or dry, water soluble fertilizer for direct application to a plant or to cropland, which may be referred to as "organic" as defined in the framework of the National Organic Standard Program of USDA. Fertilizer is produced from soybean meal using hydrolysis with proteolytic enzymes (protease) to produce water-soluble compounds containing nitrogen and include proteins, peptides, amino acids, amines and ammonia. The fertilizer also contains other essential nutrients such as calcium, phosphorus, sulfur and potassium, the fertilizer having a solids content of 10% to 50% and a total nitrogen content from 1% to 10%. However, said fertilizer does not provide carboxylic acids and the nitrogen content is very low. On the other hand, when carrying out a single enzymatic hydrolysis, in the hydrolyzate there are still compounds derived from cellulose of high molecular weight and low bioavailability, which is detrimental to the nutritional power of the composition.

The patent application WO 2015052723 A1 describes a process to produce an organic fertilizer containing nitrogen with a greater storage stability, obtained from natural, non-transgenic sources. The liquid form of the organic fertilizer contains from 2% to 10% organic nitrogen and 10% to 65% solids, while in the soluble, dry powder form it contains about 13.5% nitrogen. However, the percentage of nitrogen obtained by the proposed enzymatic reaction is low and complete degradation of the substrate is not guaranteed to obtain free amino acids or carboxylic acids. Likewise, the composition does not provide any kind of complex nutrients of high nutritional value as can be provided by extracts of yeasts and/or algae.

None of the compositions above described has a percentage of free nitrogen above 20%, nor provide carboxylic acids, free amino acids or oligosaccharides. Also, the aforementioned fertilizer compositions do not provide the plants with an adequate supply of macro and micro-elements.

In view of the above problem, there is a need to provide a new nitrogen rich foliar fertilizer composition, obtained from cellulose-rich vegetable matter and protein, free from the addition of conventional agrochemicals. Likewise, there is still a need to find a foliar fertilizer composition that can be used safely on sensitive crop plants, such as coffee, and at the same time increase crop yields by improving the nutritional status of plants.

SUMMARY OF THE INVENTION

To overcome the disadvantages of the conventional fertilizer compositions, the present invention aims to provide a novel foliar fertilizer composition obtained from the sequential hydrolyzate, of plant sources rich in cellulose and proteins, with a proteolytic enzyme with a bioactive site of cysteine followed by the addition of a cellulase isolated from *Trichoderma harzianum*.

It is a particular object of the present invention to provide a novel foliar fertilizer composition capable of increasing the production of economically important crops such as vegetables, grains, cereals and fruits.

Another object of the present invention is to provide a fertilizer composition without phytotoxic effects on the crop plants.

A further object of the present invention is to provide a foliar fertilizer composition which does not require the addition of conventional synthetic substances or agrochemical.

It is a further object of the present invention to provide a fertilizer composition that can be used in organic coffee crops.

The above-mentioned objects, as well as others and the advantages of the present invention, will become apparent from the following detailed description thereof.

DETAILED DESCRIPTION OF THE INVENTION

The present invention relates to a novel nitrogen rich foliar fertilizer (FF) composition obtained by the sequential enzymatic hydrolysis of a plant source rich in cellulose and proteins. In the present invention, said vegetable source is a soybean paste and the enzymes responsible for the hydrolysis process are an enzyme with proteolytic activity with a cysteine bioactive site and a cellulase isolated from *Trichoderma harzianum*.

The foliar fertilizer composition of the present invention contains from 43% to 45% (w/w) of total nitrogen; from 25% to 27% (w/w) free amino acids; from 35% to 37% (w/w) of total carbohydrates; from 2% to 4% (w/w) of simple carbohydrates; from 18% to 20% (w/w) oligosaccharides; from 7% to 9% (w/w) of algae matter; from 0.5% to 1.5% (w/w) of carboxylic acids; from 25% to 35% (w/w) of a yeast fermentation; from 0.01M to 0.03M sodium molybdate.

The fertilizer composition above described is obtained by an enzymatic hydrolysis process using as the starting substrate, ground soybeans seeds which are sequentially subjected to the action of two enzymes. A protease with a cysteine bioactive site and a cellulase obtained from *Trichoderma harzianum*. Said obtaining process is carried out by the following sequential steps:

a) soybean grains are milled to obtain a particle size of from 100 to 200 μm to obtain the starting substrate of the enzymatic reactions;

b) water is heated from 65° C. to 75° C. and the soybean substrate is added in a ratio of 1 part substrate per 4 parts of water, keeping constant the temperature;

c) the mixture is constantly stirred for a period from 25 to 35 minutes and then the proteolytic enzyme with cysteine bioactive site is added, which in one of the preferred embodiments of the invention is papain, in a ratio of 1:500 relative to the substrate weight and allowed to act for a period from 230 to 250 minutes at constant temperature from 65° C. to 75° C. while maintaining stirring;

d) a liquid solution of a cellulase concentrate isolated from *Trichoderma harzianum* is added to the above mixture in a ratio of 1:500 relative to the substrate weight and allowed to act for a period from 170 to 190 minutes at constant temperature from 65° C. to 75° C.; and e) from 7% to 9% an aqueous extract of seaweed, from 25% to 35% yeast fermentation, and from 0.01M to 0.03M sodium molybdate are added to the product of the last enzymatic reaction, to obtain the complete fertilizer.

The above described procedure guarantees the percent content of elements above defined, and likewise, the loss of the product nutritional values is avoided. Also, carry out two consecutive enzymatic reactions, allows a better utilization of the substrate, thus obtaining a better fertilizer composition, which also has a higher nitrogen percentage than other compositions based on protein hydrolysates.

The foliar fertilizer (FF) composition of the present invention may be used directly on the soil or be sprayed directly onto the crop aerial parts, such as for example vegetable crops, grains, cereals and fruit, and is especially useful as fertilizer in coffee crops; for this the present composition can be diluted at a rate of 2.5 L to 5 L per 300 L to 500 L of supply water and applied at a rate of 2.5 L to 5 L per hectare (ha) of land.

Example 1: Evaluation of the Effect of the Present Invention Fertilizer on the Coffee Crop Development in Veracruz State To evaluate the effect of the present invention fertilizer, foliar applications of the same were carried out on a commercial coffee crop, (*Coffea arabica* L.), "Caturra" cultivar. Fertilizer applications began when the coffee plantations were in the beginning of fruiting, although it is important to note that flowers were still present. The study began on Dec. 18, 2013, in the town of "San Pedro Altetepan" belonging to the municipality of Atzalan, Veracruz State, in commercial coffee crop and ended on Jan. 29, 2014, When the cherry harvest began.

A completely randomized experimental design with four replications was used, a surface for each experimental unit of 36 m2, made up of 4 coffee plantations established in a planting frame of 3 m×3 m was used, whereby, the surface for each treatment was of 144 m2.

The evaluated treatments are shown in Table 1. Two applications were performed via foliar with an average interval of 7 days between each one. Applications started when the coffee plantations were at the beginning of fruiting. For the applications, a SOLO® motorized sprinkler of 11 L capacity was used, which was previously calibrated obtaining a consumption of 874 L/ha (3.1 L/U.E./4 trees).

TABLE 1

Treatments evaluated in the effectiveness study of the foliar fertilizer (FF) of the present invention in the coffee crop in Veracruz State.

| No. | Treatment | L of f.p./300 L of water |
|---|---|---|
| 1 | FF | 2.0 |
| 2 | FF | 2.5 |
| 3 | FF | 3.0 |
| 4 | SP1 ® | 3.0 L/ha |
| 5 | Absolute control | — | f.p. Formulated product.

For the control of coffee tree rust (*Hemileia vastatrix*) applications of NORDOX® 75 WGD at doses of 1.5 kg/ha were carried out; for the control of anthracnose (*Colletotrichum* sp.) and leaf spot (*Cercospora* sp.) PHYTON® 27 at 0.4 L/ha was applied.

The evaluations were carried out from 21 days after the first application of the treatments, and lasted until the first harvest of the cherry coffee. The sample size was the 4 coffee plantations that constituted the experimental unit (e.u.), whereas for the nutritional analysis of the plant tissue the sample was 5 leaves chosen at random by e.u.

The evaluation method of the treatments was carried out quantitatively. The data obtained were statistically processed using the Statistical Analysis System (SAS) package, performing analysis of variance and average comparison tests (Tukey α=0.05). To determine some of the parameters, the samples of the treatments (leaves) were sent to the Plant Nutrition Laboratory of the Phytotechnics Department of the Universidad Autónoma Chapingo, where the following variables of response were quantified:

1) Seed Consistency.

According to the seed consistency, no differences were observed between the different evaluated treatments.

2) Number of Flowers Per Knot.

The analysis of variance for the number of flowers per knot (Table 4) indicates that there were no significant differences per treatment, obtaining a general average of 7.81 flowers per knot.

TABLE 4

Number of flowers per knot in different treatments, in the evaluation study of the effect of the fertilizer FF on the coffee crop in Veracruz State, 2014.

| Treatment | L of f.p./ 300 L of water | Number of flowers per knot average | Tukey* Group |
|---|---|---|---|
| FF | 2.0 | 7.750 | A |
| FF | 2.5 | 7.859 | A |
| FF | 3.0 | 7.890 | A |
| SP1 ® | 3.0 L/ha | 7.656 | A |
| Absolute control | — | 7.937 | A | f.p. Formulated product.
*The averages with the same letter are statistically the same, according to the Tukey test ($\alpha = 0.05$).

3) Number of Fruits Per Knot.

The development of the ANOVA for the variable of number of fruits per knot is shown in Table 5, where it is observed that the treatments that were applied with some type of fertilizer (FF and SP1®) were statistically equal among them (they formed the Group Tukey A), and all of them were superior to the absolute control, showing a greater number of fruits per knot. On the contrary, the treatment with the lowest number of fruits per knot was the absolute control with an average of 5.03 fruits/knot.

TABLE 5

Number of fruits per knot in different treatments, in the evaluation study of the effect of the fertilizer FF on the coffee crop in Veracruz State, 2014.

| Treatment | L of f.p./ 300 L of water | Number of fruits per knot average | Tukey* Group |
|---|---|---|---|
| FF | 2.0 | 6.6094 | A |
| FF | 2.5 | 6.8750 | A |
| FF | 3.0 | 7.1563 | A |
| SP1 ® | 3.0 L/ha | 6.7813 | A |
| Absolute control | — | 5.0313 | B | f.p. Formulated product
*The averages with the same letter are statistically the same, according to the Tukey test ($\alpha = 0.05$).

4) Conversion Rate from Flower to Fruit.

Particularly for the evaluation of the conversion rate from flower to fruit, the methodology was as follows: a knot or "axilla" was taken from a branch located in the middle third of the plant, from each cardinal point, whereby 4 knots per plant were sampled, which were marked with a color ribbon, since at the flowering time the number of flowers per knot was counted, once lapsed the time and when the fruiting occurred, the number of grains (fruits) in these same knots were counted, with that the conversion rate of flowers to fruits was obtained.

The statistical analysis for the evaluation of this parameter indicated that there were no statistical differences between the different treatments evaluated (Table 6), since the plants where some type of fertilizer was applied (FF and SP1®) showed a lower conversion rate, Tukey B group), in particular treatment 3 (FF 3.0 L/300 L of water) showed a rate of 1.138, indicating that for each 1.138 flowers a fruit is formed; on the other hand, treatment 5 (absolute control) was situated, which showed a conversion rate from flower to fruit of 1.667, indicating that out of each 1.667 flowers a fruit was formed, this shows that there was a greater number of flowers that aborted or in which the pollination was not carried out.

TABLE 6

Rate of conversion from flower to fruit in different treatments, in the evaluation study of the effect of the fertilizer FF on the coffee crop in Veracruz State, 2014.

| Treatment | L of f.p./ 300 L of water | Conversion rate average | Tukey* Group |
|---|---|---|---|
| FF | 2.0 | 1.210 | B |
| FF | 2.5 | 1.174 | B |
| FF | 3.0 | 1.138 | B |
| SP1 ® | 3.0 L/ha | 1.169 | B |
| Absolute control | — | 1.667 | A | f.p. Formulated product
*The averages with the same letter are statistically the same, according to the Tukey test ($\alpha = 0.05$).

5) Size of Fruit.

To account for the diameter of fruits, 20 fruits per experimental unit were considered. The statistical analysis for the evaluation of this parameter indicated that there were statistical differences between the different treatments evaluated (Table 7), being the treatment 3 where the fertilizer was applied (FF at doses of 3.0 L/300 L water), which showed a Greater fruit size with a mean of 11.13 mm; On the other hand, treatment 5 (absolute control) was located, which showed a smaller fruit size of 9.11 mm.

TABLE 7

Fruit size in different treatments, in the evaluation study of the effect of the fertilizer FF on the coffee crop in Veracruz State, 2014.

| Treatment | L of f.p./ 300 L of water | Size of fruit average | Tukey* Group |
|---|---|---|---|
| FF | 2.0 | 9.410 | D |
| FF | 2.5 | 10.840 | B |
| FF | 3.0 | 11.130 | A |
| SP1 ® | 3.0 L/ha | 10.430 | C |
| Absolute control | — | 9.110 | E | f.p. Formulated product
*The averages with the same letter are statistically the same, according to the Tukey test ($\alpha = 0.05$).

6) Total Leaf Nitrogen Content.

Table 8 shows the results of the analysis of variance for the variable of total leaf nitrogen content. The treatment with the highest content for this nutrient in plant tissue (leaf) was treatment 3 (FF at 3.0 L/300 L water) with an average content of 3.0%, followed by treatments 1 and 2 (FF at 2.0 and 2.5 L/300 L water) with an average content of 2.7%. Statistically, the absolute control treatment was lower than the rest with a content of 2.2%.

TABLE 8

Total leaf nitrogen content in different treatments, in the evaluation study of the effect of the fertilizer FF on the coffee crop in Veracruz State, 2014.

| Treatment | L of f.p./ 300 L of water | Total leaf nitrogen content (%) average | Tukey* Group |
|---|---|---|---|
| FF | 2.0 | 2.70 | B |
| FF | 2.5 | 2.70 | B |
| FF | 3.0 | 3.00 | A |
| SP1 ® | 3.0 L/ha | 2.40 | C |
| Absolute control | — | 2.20 | D | f.p. Formulated product
*The averages with the same letter are statistically the same, according to the Tukey test ($\alpha = 0.05$).

7) Leaf Phosphorus Content.

The ANOVA for the variable of leaf phosphorus is shown in Table 9. The highest content of this nutrient in leaf was obtained in samples from treatments 2 and 3 (FF at 2.5 and 3.0 L/300 L water), with average content of 0.16%. In group B treatments 1 and 4 were located (FF at 2.0 L/300 L water and SP1® at 3.0 L/ha) with an average content of 0.14 and 0.15 respectively. In the group Tukey C was placed the treatment 5 with the lowest content of this nutrient in leaf (0.12%).

TABLE 9

Leaf phosphorus content in different treatments, in the evaluation study of the effect of the fertilizer FF on the coffee crop in Veracruz State, 2014.

| Treatment | L of f.p./ 300 L of water | Leaf phosphorus content (%) average | Tukey* Group |
|---|---|---|---|
| FF | 2.0 | 0.14 | B |
| FF | 2.5 | 0.16 | A |
| FF | 3.0 | 0.16 | A |
| SP1 ® | 3.0 L/ha | 0.15 | AB |
| Absolute control | — | 0.12 | C | f.p. Formulated product
*The averages with the same letter are statistically the same, according to the Tukey test ($\alpha = 0.05$).

8) Leaf Potassium Content.

The ANOVA for the variable of leaf potassium is shown in Table 10. The highest content of this nutrient in leaf was obtained in samples from treatments 2 and 4 (FF at 2.5 L/300 L water and SP1® at 3.0 L/Ha), with an average content of 2.5%. In group B treatments 1 and 3 were located with an average content of 2.4%; in the group Tukey C was located the treatment 5 (absolute control) with a content of 2.2% K in leaf.

TABLE 10

Leaf potassium content in different treatments, in the evaluation study of the effect of fertilizer FF in the coffee crop in Veracruz State, 2014.

| Treatment | L of f.p./ 300 L of water | Leaf potassium content (%) average | Tukey* Group |
|---|---|---|---|
| FF | 2.0 | 2.40 | B |
| FF | 2.5 | 2.50 | A |
| FF | 3.0 | 2.40 | B |
| SP1 ® | 3.0 L/ha | 2.50 | A |
| Absolute control | — | 2.20 | C | f.p. Formulated product
*The averages with the same letter are statistically the same, according to the Tukey test ($\alpha = 0.05$).

9) Leaf Calcium Content.

Table 11 shows the results of the analysis of variance for the variable of leaf calcium content. It was observed that all the treatments were different from each other, forming 4 statistical groups. The treatment with the highest nutrient content in plant tissue (leaf) was the treatment 3 (FF at 3.0 L/300 L water) with an average content of 1.05%, followed by treatment 2 (FF at 2.5 L/300 L water) with an average content of 1.0%, the treatments 1 and 4 (FF at 2.0 L/300 L water and SP1® at 3.0 L/ha) were located in the Tukey C group with an average content of 0.86% and 0.88% Ca respectively. The plants with lower leaf Ca content were those from the absolute control, with an average content of 0.73%.

TABLE 11

Leaf calcium content in different treatments, in the evaluation study of the effect of the fertilizer FF on the coffee crop in Veracruz State, 2014.

| Treatment | L of f.p./ 300 L of water | Leaf calcium content (%) average | Tukey* Group |
|---|---|---|---|
| FF | 2.0 | 0.86 | C |
| FF | 2.5 | 1.00 | B |
| FF | 3.0 | 1.05 | A |
| SP1 ® | 3.0 L/ha | 0.88 | C |
| Absolute control | — | 0.73 | D | f.p. Formulated product
*The averages with the same letter are statistically the same, according to the Tukey test ($\alpha = 0.05$).

10) Leaf Magnesium Content.

The analysis of variance for the leaf magnesium content is shown in Table 12. The formation of four Tukey groups was observed, i.e., the treatments were different from each other. The treatment with the highest content for this nutrient in plant tissue (leaf) was the treatment 4 (SP1® at 3.0 L/ha) with an average content of 0.44%, followed by treatment 3 (FF at 3.0 L/300 L water) with an average content of 0.38%, the treatments 1 and 2 (FF at 2.0 and 2.5 L/300 L water) were located in the Tukey group with an average content of 0.34% and 0.35% Mg, respectively. The plants with the lowest content of Mg in leaves were those from the absolute control, with an average content of 0.30%, so that they were statistically located in the last Tukey group.

TABLE 12

Leaf magnesium content in different treatments, in the evaluation study of the effect of the fertilizer FF on the coffee crop in Veracruz State, 2014.

| Treatment | L of f.p./ 300 L of water | Leaf magnesium content (%) average | Tukey* Group |
|---|---|---|---|
| FF | 2.0 | 0.34 | C |
| FF | 2.5 | 0.35 | C |
| FF | 3.0 | 0.38 | B |
| SP1 ® | 3.0 L/ha | 0.44 | A |
| Absolute control | — | 0.30 | D | f.p. Formulated product
*The averages with the same letter are statistically the same, according to the Tukey test ($\alpha = 0.05$).

11) Leaf Sulfur Content (Sulfur Sulfate).

The ANOVA for the variable of leaf sulfur is shown in Table 13. The highest content of this nutrient in leaf was obtained in samples from treatment 3 (FF at 3.0 L/300 L water), with an average content of 0.09%. In group B the rest of the treatments with a statistically equal content were located.

TABLE 13

Leaf sulfur content (sulfur sulfate) in different treatments, in the FF fertilizer evaluation study in the coffee crop in Veracruz State, 2014.

| Treatment | L of f.p./ 300 L of water | Leaf $SO_4$—S content (%) average | Tukey* Group |
|---|---|---|---|
| FF | 2.0 | 0.07 | B |
| FF | 2.5 | 0.07 | B |
| FF | 3.0 | 0.09 | A |

TABLE 13-continued

Leaf sulfur content (sulfur sulfate) in different
treatments, in the FF fertilizer evaluation study
in the coffee crop in Veracruz State, 2014.

| Treatment | L of f.p./ 300 L of water | Leaf SO$_4$—S content (%) average | Tukey* Group |
|---|---|---|---|
| SP1 ® | 3.0 L/ha | 0.07 | B |
| Absolute control | — | 0.06 | B | f.p. Formulated product
*The averages with the same letter are statistically the same, according to the Tukey test ($\alpha = 0.05$).

12) Leaf Iron Content.

The variance analysis for the leaf iron content is shown in table 14. The formation of four Tukey groups was observed, i.e., the treatments were different from each other. The treatment with the highest content for this nutrient in plant tissue (leaf) was the treatment 4 (SP1® at 3.0 L/ha) with an average content of 169 µg/g, followed by treatments 2 and 3 (FF at 2.5 and 3.0 L/300 L water) with an average content of 148 and 149 µg/g respectively, the treatment 1 was located in the Tukey C group (FF at 2.0 L/300 L water) with an average content of 145 µg/g of Fe. The plants with lower Fe content in leaves were of the absolute control, with an average content of 104 µg/g.

TABLE 14

Leaf iron content in different treatments, in the evaluation study of the effect of the fertilizer FF on coffee crop in Veracruz State, 2014.

| Treatment | L of f.p./ 300 L of water | Leaf iron content (µg/g) average | Tukey* Group |
|---|---|---|---|
| FF | 2.0 | 145.0 | C |
| FF | 2.5 | 149.0 | B |
| FF | 3.0 | 148.0 | B |
| SP1 ® | 3.0 L/ha | 169.0 | A |
| Absolute control | — | 104.0 | D | f.p. Formulated product
*The averages with the same letter are statistically the same, according to the Tukey test ($\alpha = 0.05$).

13) Leaf Zinc Content.

The ANOVA for the variable of leaf zinc is shown in Table 15, in this table the formation of three statistical groups is observed. The highest content of this leaf micronutrient was obtained in samples from treatment 4 (SP1® at 3.0 L/ha), with an average content of 38 µg/g. In group B the treatments 1, 2 and 3 (FF at 2.0, 2.5 and 3.0 L/300 L water) with a similar average content of 33 and 34 µg/g were located. The plants with the lowest leaf Zn content were those from the absolute control, with an average content of 27 µg/g.

TABLE 15

Leaf zinc content in different treatments, in the evaluation study of the effect of the fertilizer FF on the coffee crop in Veracruz State, 2014.

| Treatment | L of f.p./ 300 L of water | Leaf boron content (µg/g) average | Tukey* Group |
|---|---|---|---|
| FF | 2.0 | 34.0 | B |
| FF | 2.5 | 33.0 | B |
| FF | 3.0 | 34.0 | B |
| SP1 ® | 3.0 L/ha | 38.0 | A |
| Absolute control | — | 27.0 | C | f.p. Formulated product
*The averages with the same letter are statistically the same, according to the Tukey test ($\alpha = 0.05$).

14) Leaf Boron Content.

The ANOVA for the leaf boron variable is shown in Table 16, this table shows the formation of five statistical groups, i.e., the treatments were different from each other. The highest content of this nutrient in the leaf was obtained in samples from treatment 4 (SP1® at 3.0 L/ha), with an average content of 47 µg/g. Followed by treatment 2 (FF at 2.5 L/300 L water) with a content of 45 µg/g. The plants with lower leaf B content were those from the absolute control, with an average content of 37 µg/g.

TABLE 16

Leaf boron content in different treatments, in the evaluation study of the effect of the fertilizer FF on the coffee crop in Veracruz State, 2014.

| Treatment | L of f.p./ 300 L of water | Leaf boron content (µg/g) average | Tukey* Group |
|---|---|---|---|
| FF | 2.0 | 40.0 | D |
| FF | 2.5 | 45.0 | B |
| FF | 3.0 | 42.0 | C |
| SP1 ® | 3.0 L/ha | 47.0 | A |
| Absolute control | — | 37.0 | E | f.p. Formulated product
*The averages with the same letter are statistically the same, according to the Tukey test ($\alpha = 0.05$).

15) Estimated Yield Kg/U.E and ton/ha (Cherry).

Table 17 shows the ANOVA for the performance variable; in this table, it is observed that the absolute control was the treatment with lower yield per hectare (1,110 tonnes), while the rest of the treatments were statistically different among them, being treatments 2 and 3 (FF at 2.5 and 3.0 L/300 L Water) with a high average of more than 1.360 and 1.417 ton/ha respectively.

TABLE 17

Estimated yield of cherry coffee in different treatments, in the evaluation study of the effect of the fertilizer FF on the coffee crop in Veracruz State, 2014.

| Treatment | L of f.p./ 300 L of water | Cherry coffee yield Kg/U.E. | ton/ha | Tukey* Group |
|---|---|---|---|---|
| FF | 2.0 | 4.405 | 1.225 | B |
| FF | 2.5 | 4.887 | 1.360 | A |
| FF | 3.0 | 5.097 | 1.417 | A |
| SP1 ® | 3.0 L/ha | 4.240 | 1.180 | BC |
| Absolute control | — | 3.995 | 1.110 | C | f.p. Formulated product
*The averages with the same letter are statistically the same, according to the Tukey test ($\alpha = 0.05$).

16) Estimated Yield of Parchment Coffee (Café Pergamino).

Table 18 shows the ANOVA for the yield variable. As can be corroborated in said Table, the absolute control was the treatment with lower yield per hectare (4.44 Qq), while the rest of the treatments were statistically all different among them, being treatment 3 (fertilizer of the present invention 3.0 L/300 L water) which presented a mean higher than the others which was 5.66 Qq/ha.

TABLE 18

Estimated yield of cherry coffee in different treatments, in the evaluation study of the effect of the fertilizer FF on the coffee crop in Veracruz State, 2014.

| Treatment | L of f.p./ 300 L of water | Cherry coffee yield Qq/ha | Tukey* Group |
|---|---|---|---|
| FF | 2.0 | 4.89 | C |
| FF | 2.5 | 5.43 | B |
| FF | 3.0 | 5.66 | A |
| SP1 ® | 3.0 L/ha | 4.70 | D |
| Absolute control | — | 4.44 | E | f.p. Formulated product
*The averages with the same letter are statistically the same, according to the Tukey test ($\alpha = 0.05$).

17) Phytotoxicity.

The phytotoxicity of the fertilizer for the crop was assessed by comparing the occurrence of abnormal symptoms in the plants treated with the leaf fertilizer of the present invention with respect to the regional control and absolute control plants. For the damage evaluation, the scoring scale proposed by the European Weed Research Society (EWRS) (Table 2) and its percentage agronomic interpretation were used (Table 3).

TABLE 2

Scoring scale proposed by EWRS (European Weed Research Society) to evaluate weed control and crop phytotoxicity.

| Value | Effects on weeds | Effect on culture |
|---|---|---|
| 1 | Complete death | Without effect |
| 2 | Very good control | Very light symptoms |
| 3 | Good control | Light Symptoms |
| 4 | Enough in practice | Symptoms are not reflected in yield |
| | LIMIT OF ACCEPTABILITY | |
| 5 | Middle control | Mean damage |
| 6 | Regular | High damage |
| 7 | Poor control | Severe damage |
| 8 | Very poor control | Very severe damage |
| 9 | Uncontrolled | Complete death |

TABLE 3

Transformation from the logarithmic scoring scale of the EWRS to percentage scale.

| Value | % weed control | % Phytotoxicity |
|---|---|---|
| 1 | 99.0 to 100 | 0.0 to 1.0 |
| 2 | 96.5 to 99.0 | 1.0 to 3.5 |
| 3 | 93.0 to 96.5 | 3.7 to 7.0 |
| 4 | 87.5 to 93.0 | 7.0 to 12.5 |
| 5 | 80.0 to 87.5 | 12.5 to 20.0 |
| 6 | 70.0 to 80.0 | 20.0 to 30.0 |
| 7 | 50.0 to 70.0 | 30.0 to 50.0 |
| 8 | 1.0 to 50.0 | 50.0 to 99.0 |
| 9 | 0.0 to 1.0 | 99.0 to 100 |

No symptoms of phytotoxicity were observed in any of the treatments with respect to the absolute control. Therefore, according to the phytotoxicity scale of the European Weed Research Society, the use of the foliar fertilizer of the present invention in the coffee crop is rated 1, with no effect on the crop.

From the above, it can be inferred that the FF fertilizer in the evaluated doses 2.0, 2.5 and 3.0 L/300 L water, induces a positive response in most of the variables evaluated in the coffee (*Coffea arabica* L.) culture, with respect to absolute control, showing statistically to be the best treatments, in addition to improving the nutritional content in plant tissue (leaf) in the treated plants. Also, the FF fertilizer in the evaluated doses did not cause phytotoxic effects in the coffee plants, being classified as 1 (without effect on the crop) according to the scale of the EWRS.

According to the above results, it can be ensured that the fertilizer composition of the present invention functions as a complete fertilizer in vegetables, grains and fruit, standing out as an excellent fertilizer for coffee plantations, by increasing the supply of macro and microelements, with the consequent increase in the final production yield of the trees.

The present invention has been described according to a preferred embodiment; however, it will be apparent to a person skilled in the art that modifications may be made to the invention without departing from its spirit and scope.

The invention claimed is:

1. A foliar fertilizer composition comprising a soybean hydrolysate, with nitrogen, carbohydrates, amino acids and oligosaccharides, wherein the foliar fertilizer composition comprises from 43% to 45% (w/w) of total nitrogen; from 25% to 27% (w/w) of free amino acids; from 35% to 37% (w/w) of total carbohydrates; from 18% to 20% (w/w) of oligosaccharides; from 7% to 9% (w/w) of algae matter; from 0.5% to 1.5% (w/w) of carboxylic acids; from 25% to 35% (w/w) of a fermented yeast; and from 0.01M to 0.03M of sodium molybdate.

2. The composition according to claim 1, wherein the composition comprises from 2% to 4% (w/w) of simple carbohydrates.

3. A method for fertilizing crops, wherein the method comprises applying the fertilizer composition of claim 1 directly onto crop soil or spraying the composition onto crop aerial parts.

4. The method according to claim 3, wherein applying the composition is made by spraying the composition onto the crop aerial parts.

5. The method according to claim 3, wherein the method comprises the step of diluting the composition at rate of 2.5 L to 5 L per 300 L to 500 L of water, before being applied to the crop soil or sprayed onto the crop aerial parts.

6. The method according to claim 4, wherein applying the diluted composition to the crop soil or crop aerial parts is carried out in a rate of 2.5 L to 5 L per hectare (ha) of crop soil or crop.

7. The method according to claim 6, wherein the crops are selected from crops of vegetables, grains, cereals and fruit trees.

8. The method according to claim 7, wherein the crop of fruit trees is coffee.

9. A method of using the composition of claim 1 for crop fertilization comprising applying the composition directly onto crop soil or onto crop aerial parts, wherein the composition used is diluted at a rate of 2.5 L to 5 L for every 300 L to 500 L of water.

10. The method according to claim 9, wherein the composition is sprayed onto the crop aerial parts.

11. The method according to claim 9, wherein the application of the diluted composition to the crop soil or crop aerial parts is carried out in a proportion of 2.5 L to 5 L per hectare (ha) of crop soil or crop.

12. The method according to claim 11, wherein the crops are selected from crops of vegetables, grains, cereals and fruit trees.

13. The method according to claim 12, wherein the fruit trees are coffee.

14. A process for obtaining a fertilizer composition according to claim 1, wherein the process comprises the steps of:
   a) grinding soybean grains to obtain a particle size of from 100 to 200 μm to obtain a soybean substrate;
   b) heating water from 65° C. to 75° C., adding the soybean substrate at a ratio of 1 part of substrate to 4 parts of water, and keeping a constant temperature to obtain a mixture;
   c) shaking the mixture of step b) for a period from 25 to 35 minutes and then adding a proteolytic enzyme with a cysteine bioactive site in a ratio of 1:500 relative to the weight of the substrate and allowing the mixture to react for a time period from 230 to 250 minutes at constant temperature from 65° C. to 75° C.;
   d) adding a liquid solution of a concentrate of cellulases isolated from *Trichoderma harzianum* in a ratio of 1:500 relative to the substrate weight and allowing the mixture to react for a time period from 170 to 190 minutes at constant temperature from 65° C. to 75° C.; and
   e) adding from 7% to 9% an aqueous extract of seaweed and from 25% to 35% of a fermented yeast.

15. The process according to claim 14, wherein the proteolytic enzyme with cysteine bioactive site is papain.

* * * * *